UNITED STATES PATENT OFFICE.

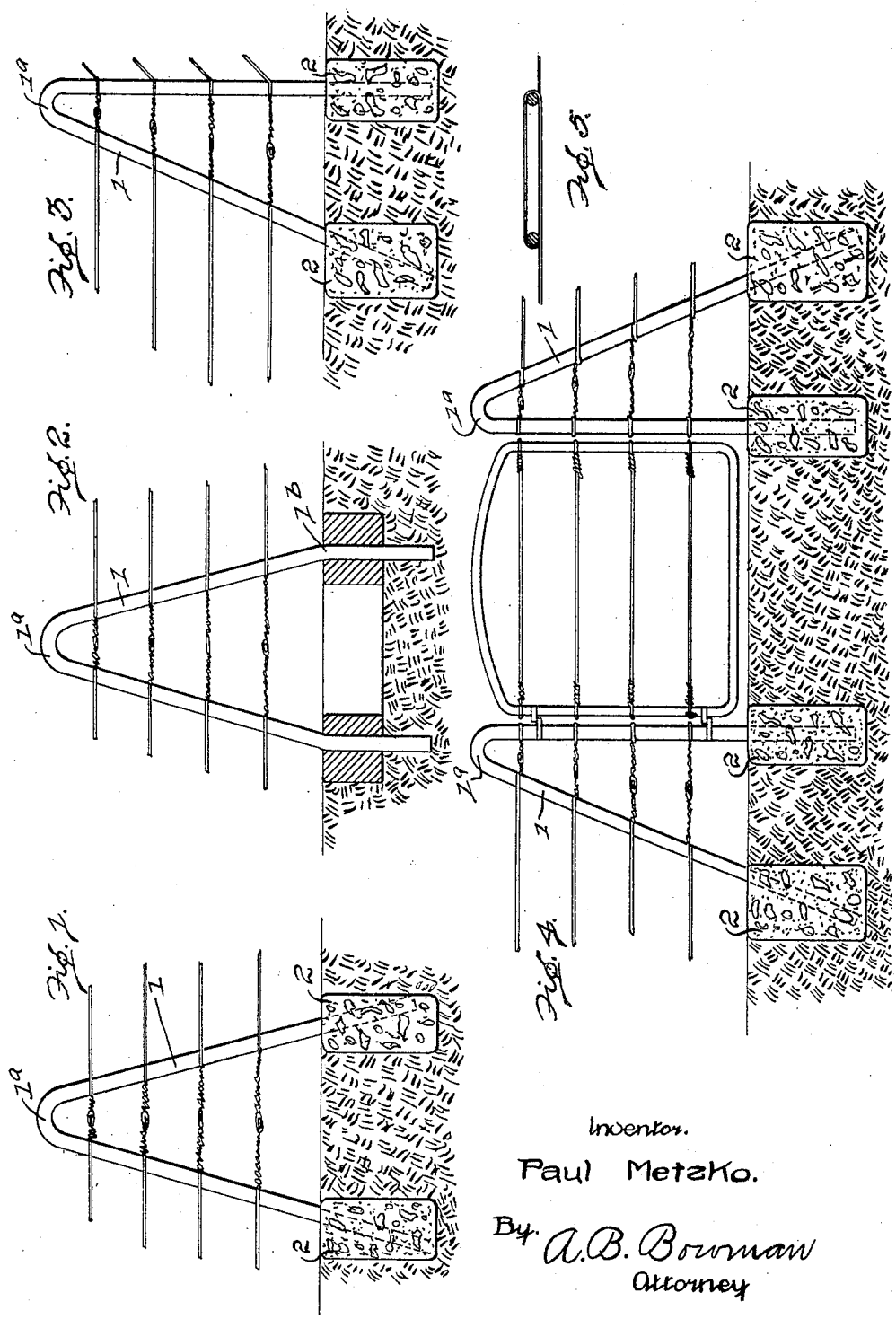

PAUL METZKO, OF SAN DIEGO, CALIFORNIA.

FENCE.

1,319,887.   Specification of Letters Patent.   Patented Oct. 28, 1919.

Application filed September 19, 1916. Serial No. 120,946.

*To all whom it may concern:*

Be it known that I, PAUL METZKO, a citizen of the United States, residing at San Diego, in the county of San Diego and State of California, have invented certain new and useful Improvements in Fences, of which the following is a specification.

My invention relates to fences, more particularly wire fences, and the objects of my invention are: First, to provide a fence post that combines strength and durability with a construction to which the wires may be readily secured and stretched by simply twisting the wires together. Second, to provide a fence post of this class with means for anchorage in the ground. Third, to provide a fence of this kind which is economical of construction, durable and easy to install.

With these and other objects in view as will appear hereinafter, my invention consists of certain novel features of construction, combination and arrangement of parts, as will be hereinafter described in detail, and particularly set forth in the appended claim, reference being had to the accompanying drawings, and to the characters of reference thereon which form a part of this specification in which:

Figure 1 is a side elevational view of my post in one form showing a fragmentary portion of the wires attached thereto. Fig. 2 is a similar view showing the anchorage member in a slightly modified form from that of Fig. 1. Fig. 3 is a perspective view, showing the corner or end post with the same form of anchorage as that of Fig. 1. Fig. 4 is a side elevational view of two posts the same as that shown in Fig. 3 and showing a gate mounted between the two, and Fig. 5 is a sectional view of one of the posts showing the position of the wire before twisting.

Similar characters of reference refer to similar parts throughout the several views.

The bar 1 anchorage 2 and wires 3 constitute the principal parts of my fence.

The bar 1 is preferably a metallic bar either of angle, round or pipe in cross section as desired, and it is bent in the middle at 1ª, and the extended ends diverge downwardly so that they are spaced some distance apart at their lower ends. Mounted on these extended ends are anchorage members 2 which in the preferred construction are composed of concrete so that the holes may be dug in the ground of the proper depth and size, and the ends inserted in the holes and the holes filled with concrete. In the modified form of construction however, shown in Fig. 2 of the drawings, the anchorage member 2 consists of a piece of iron provided with a hole in each end, and the ends of the bar 1 are bent at 1ᵇ so that they are practically perpendicular from the ground line downward, and are inserted in the holes in said anchorage piece, and the ends extend through into the ground. The corner and end posts as shown in Figs. 3 and 4 of the drawings are constructed the same as that shown in Fig. 1 except that one side member is practically perpendicular while the other member angles therefrom. The wires are secured to the posts by making one wrap around the post (as shown best in Fig. 5 of the drawings) at the desired elevation from the ground with the wire between the posts as tight as practicable. Then the wires are twisted around each other between the two post members tightening the wire between the posts and securing it so that it will not raise and lower on said posts.

Though I have shown and described a particular construction, combination and arrangement of parts, I do not wish to be limited to this particular construction, combination, and arrangement, but desire to include in the purview of my invention the construction, combination and arrangement substantially as set forth in the appended claim.

It is obvious that with this construction there is provided a fence which by reason of the particular construction, may be made of materials which are very durable and will not readily deteriorate, that the bar 1 may be covered with galvanized material so that it will not rust and the portion in the ground covered with concrete and the wires secured by twisting, that it will not raise and lower because of the angles of the post members that all the material is very durable and that the posts are so constructed as to provide a maximum of strength where strength is required, and that the fence as a whole may be easily installed.

Having thus described my invention, what I claim as new and desire to secure by Letters Patent, is:

In a fence of the class described, the combination of a plurality of posts each consisting of an inverted V shaped metallic bar placed parallel with the line of the fence and a plurality of wires parallel therewith and resting against both members of said post and secured thereto in spaced relation to each other, by looping said wires around the two members and inter-twisting the loop between said two members whereby a loop is formed around each member for preventing said wires from moving up and down on said bars by reason of the angle of said bars to each other.

In testimony whereof I have hereunto set my hand at San Diego, California, this 14th day of September, 1916.

PAUL METZKO.

Copies of this patent may be obtained for five cents each, by addressing the "Commissioner of Patents, Washington, D. C."